US008789046B2

(12) United States Patent
Franke et al.

(10) Patent No.: US 8,789,046 B2
(45) Date of Patent: Jul. 22, 2014

(54) METHOD TO EMBED A LIGHT-WEIGHT KERNEL IN A FULL-WEIGHT KERNEL TO PROVIDE A HETEROGENEOUS EXECUTION ENVIRONMENT

(75) Inventors: Hubertus Franke, Cortlandt Manor, NY (US); Todd A. Inglett, Rochester, MN (US); Yoonho Park, Chappaqua, NY (US); Hartmut Penner, Hildrizhausen (DE); Bryan S. Rosenburg, Cortlandt Manor, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/435,014

(22) Filed: Mar. 30, 2012

(65) Prior Publication Data

US 2013/0263121 A1 Oct. 3, 2013

(51) Int. Cl.
*G06F 9/455* (2006.01)

(52) U.S. Cl.
USPC .............................. 718/1; 718/100; 719/319

(58) Field of Classification Search
None
See application file for complete search history.

(56) References Cited

U.S. PATENT DOCUMENTS

| | | | |
|---|---|---|---|
| 6,151,684 A | 11/2000 | Alexander et al. | |
| 7,761,687 B2 * | 7/2010 | Blumrich et al. | 712/11 |
| 8,024,742 B2 * | 9/2011 | Lescouet et al. | 718/108 |
| 8,261,249 B2 * | 9/2012 | Archer et al. | 717/149 |
| 8,370,614 B2 * | 2/2013 | Dalton et al. | 713/2 |
| 8,447,912 B2 * | 5/2013 | Archer et al. | 711/6 |
| 8,621,496 B2 * | 12/2013 | Madampath | 719/330 |
| 2008/0059676 A1 * | 3/2008 | Archer et al. | 710/260 |
| 2008/0059677 A1 | 3/2008 | Archer et al. | |
| 2010/0082788 A1 * | 4/2010 | Mundy | 709/223 |
| 2010/0162265 A1 | 6/2010 | Heddes | |
| 2010/0229183 A1 | 9/2010 | Bae et al. | |
| 2011/0191783 A1 | 8/2011 | Le Moal | |
| 2011/0219208 A1 * | 9/2011 | Asaad et al. | 712/12 |

(Continued)

FOREIGN PATENT DOCUMENTS

WO 2010064277 A1 6/2010

OTHER PUBLICATIONS

Mark Giampapa, Thomas Gooding, Todd Inglett, Robert W. Wisniewski. "Experiences with a lightweight supercomputer kernel: Lessons learned from Blue Gene's CNK" Proceedings of the 2010 ACM/IEEE International Conference for High Performance Computing (SC10). New Orleans, LA. Nov. 2010.

(Continued)

*Primary Examiner* — Emerson Puente
*Assistant Examiner* — Hiren Patel
(74) *Attorney, Agent, or Firm* — Scully, Scott, Murphy & Presser, P.C.; Daniel P. Morris, Esq.

(57) ABSTRACT

Enabling a Light-Weight Kernel (LWK) to run in a virtualized environment on a Full-Weight Kernel (FWK), in one aspect, may include replacing a FWK loader, e.g., FWK's dynamic library loader or linker, with a LWK library on a first computing entity for an application allocated to run on one or more second computing entities. The LWK library may be enabled to initialize the one or more second computing entities and associated memory allocated to run the application under the LWK library. The LWK library may be enabled to manage the one or more second computing entities and said associated memory and resources needed by the application.

22 Claims, 8 Drawing Sheets

(56) References Cited

U.S. PATENT DOCUMENTS

| | | |
|---|---|---|
| 2011/0271126 A1 | 11/2011 | Hill |
| 2012/0173730 A1 | 7/2012 | Krumpe, Jr. |
| 2012/0260123 A1 | 10/2012 | Madampath |
| 2012/0331243 A1* | 12/2012 | Aho et al. .................... 711/154 |
| 2012/0331307 A1 | 12/2012 | Fernandez Gutierrez |
| 2013/0054859 A1 | 2/2013 | Berezecki |

OTHER PUBLICATIONS

Juan A. Colmenares, Sarah Bird, Henry Cook, Paul Pearce, David Zhu, John Shalf, Steven Hofmeyr, Krste Asanović, John Kubiatowicz "Resource management in the Tessellation manycore OS. Proceedings of the 2nd USENIX Workshop on Hot Topics in Parallelism" (HotPar 2010). Berkeley, CA. Jun. 2010.

David Wentzlaff, Charles Gruenwald III, Nathan Beckmann, Kevin Modzelewski, Adam Belay, Lamia Youseff, Jason Miller, Anant Agarwal "An operating system for multicore and clouds: Mechanisms and implementation. Proceedings of the 1st ACM Symposium on Cloud Computing" (SoCC 2010). Indianapolis, IN. Jun. 2010.

John Lange, Kevin Padretti, Trammell Hudson, Peter Dinda, Zheng Cui, Lei Xia, Patrick Bridges, Andy Gocke, Steven Jaconette, Mike Levenhagen, Ron Brightwell "Palacios and Kitten: New high performance operating systems for scalable virtualized and native supercomputing" Proceedings of the 24th IEEE International Parallel and Distributed Processing Symposium (IPDPS 2010). Atlanta, GA. Apr. 2010.

Kazutomo Yoshii, Kamil Iskra, P. Chris Broekema, Harish Naik, Pete Beckman "Characterizing the performance of Big Memory on Blue Gene Linux" Proceedings of the 22nd International Workshop on Parallel Programming Models and Systems Software for High-End Computing , (P2S2 2009) Vienna, Austria. Sep. 2009.

Jonathan Appavoo, Volkmar Uhlig, Amos Waterland, Bryan Rosenburg, Dilma Da Silva, Jose Moreira. Kittyhawk "Enabling cooperation and competition in a global shared computational system" IBM Journal of Research and Development Aug. 2009.

Silas Boyd-Wickizer, Haibo Chen, Rong Chen, Yandong Mao, Fraans Kaashoek, Robert Morris, Aleksey Pesterev, Lex Stein, Ming Wu, Yuehua Dai, Yag Zhang, Zeng Zhang. Corey "An operating system for many cores" Proceedings of the 8th USENIX Conference on Operating Systems Design and Implementation (OSDI 2008). San Diego, CA. Dec. 2008.

Edi Shmueli, George Almasi, Jose Brunheroto, Jose Castarlos, Gabor Dózsa, Sameer Kumar, Derek Lieber "Evaluating the effect of replacing CNK with Linux on the compute-nodes of Blue Gene/L" Proceedings of the 22nd ACM International Conference on Supercomputing (ICS 2008), Island of Kos, Greece. Jun. 2008.

Arnd Bergmann "Linux on Cell Broadband Engine status update. Linux Symposium" Ottawa, Canada. Jun. 2007.

Hayden Kwok-Hay So, Artem Tkachenko, Robert Brodersen, "A unified hardware/software runtime environment for FPGA-based reconfigurable computers using BORPH" Proceedings of the 4th International Conference on Hardware/Software Codesign and System Synthesis (CODES+ISSS 2006), Seoul, Korea. Oct. 2006.

U.S. Office Action mailed Apr. 22, 2013 in related U.S. Appl. No. 13/435,100.

U.S. Office Action mailed Oct. 10, 2013 in related U.S. Appl. No. 13/435,100.

* cited by examiner

METHOD TO EMBED A LIGHT-WEIGHT KERNEL IN A FULL-WEIGHT KERNEL TO PROVIDE A HETEROGENEOUS EXECUTION ENVIRONMENT

FIELD

The present application relates generally to computers and operating system kernels, and more particularly to providing an ability to run a Light-Weight Kernel (LWK) and a Full-Weight Kernel (FWK) in the same environment, for instance, to provide a heterogeneous execution environment, for example, in massively parallel high performance computing.

BACKGROUND

Mark Giampapa et al. (Mark Giampapa, Thomas Gooding, Todd Inglett, Robert W. Wisniewski. Experiences with a lightweight supercomputer kernel: Lessons learned from Blue Gene's CNK. Proceedings of the 2010 ACM/IEEE International Conference for High Performance Computing (SC10). New Orleans, La. November 2010) outlines the different approaches taken by HPC operating system kernels. The kernels fall into a spectrum defined at one end by Light-Weight Kernels (LWKs) and at the other end by Full-Weight Kernels (FWKs). Typically, LWKs such as Compute Node Kernel (CNK) provide higher performance and scalability than FWKs such as Linux but less functionality. LWKs achieve higher performance and scalability because they give applications direct access to physical resources. FWKs maintain ownership of physical resources and arbitrate access among many applications. LWKs have less functionality than FWKs because LWKs are specialized. Linux runs on many different platforms and has a large developer base.

There have been attempts to bridge the gaps between LWKs and FWKs. These approaches may fall into two categories: (1) add FWK functionality to an LWK; and (2) improve FWK performance for HPC applications. Application performance has many aspects including efficiency, scalability, and reliability. In the present disclosure, performance refers to overall application performance, measured by time to completion.

CNK, which runs on the Blue Gene® supercomputer from International Business Machines Corporation (IBM®), adds FWK (e.g., Linux) functionality to the HPC. This approach has been successful in adding Linux functionality while maintaining performance and scalability, but functionality gaps still exist, e.g., file mmap is read-only, fork is not supported, and thread scheduling is non-preemptive.

The Pallacios/Kitten project is another approach (See, John Lange, Kevin Padretti, Trammell Hudson, Peter Dinda, Zheng Cui, Lei Xia, Patrick Bridges, Andy Gocke, Steven Jaconette, Mike Levenhagen, Ron Brightwell. Palacios and Kitten: New high performance operating systems for scalable virtualized and native supercomputing. Proceedings of the $24^{th}$ IEEE International Parallel and Distributed Processing Symposium (IPDPS 2010). Atlanta, Ga. April, 2010). Kitten is an LWK developed at Sandia®. Pallacios is a virtual machine monitor (VMM) that has been ported to Kitten. Pallacios allows both LWKs and FWKs to run unmodified on Kitten; it allows Kitten to host Linux as a guest operating system. This approach provides the performance and scalability of LWKs and the functionality of FWKs. However, the functionality of the FWK is limited by the VMM. For example, Pallacios does not support multi-core guests at this time. Further, VMM is a complex layer of software requiring maintenance for each Linux release.

ZeptoOS modifies Linux to set aside memory during boot and to allocate it in large regions (See e.g., Kazutomo Yoshii, Kamil Iskra, P. Chris Broekema, Harish Naik, Pete Beckman. Characterizing the performance of Big Memory on Blue Gene Linux. Proceedings of the $22^{nd}$ International Workshop on Parallel Programming Models and Systems Software for High-End Computing (P2S2 2009). Vienna, Austria. September, 2009). This memory management modification along with removing unnecessary daemons to reduce noise improved the performance and scalability of Linux. Schmueli took a similar approach by adding large page support to Linux (See, Edi Shmueli, George Almási, Jose Brunheroto, Jose Castaños, Gabor Dózsa, Sameer Kumar, Derek Lieber. Evaluating the effect of replacing CNK with Linux on the compute-nodes of Blue Gene/L. Proceedings of the $22^{nd}$ ACM International Conference on Supercomputing (ICS 2008). Island of Kos, Greece. June 2008). In addition to removing unnecessary daemons, running daemons were synchronized to further reduce noise.

The ZeptoOS approach and the Schmueli approach improve the performance and scalability of Linux. However, both approaches require significant changes to Linux, and the changes must be manually merged to each new release of the Linux kernel.

The Cell Broadband Engine (Cell/BE) consists of a general purpose PowerPC called the PPE (PowerPC Processing Element) and eight vector processors called the Synergistic Processing Elements (SPEs). The PPE and SPEs do not share memory, and each SPE has its own local memory. Linux runs on the PPE. It has been modified to provide access to SPE state and memory through a file system interface. System calls are added to allocate an SPE and to start an SPE. Application code that is run on the SPE must not have any system call instructions; rather, system call instructions are replaced by code that returns code to Linux running on the PPE.

BRIEF SUMMARY

A method and system for enabling a Light-Weight Kernel (LWK) to run in a virtualized environment on a Full-Weight Kernel (FWK) may be provided. The method, in one aspect, may include replacing a FWK loader with a LWK library on a first computing entity for an application allocated to run on one or more second computing entities. The method may also include enabling the LWK library to initialize the one or more second computing entities and associated memory allocated to run the application under the LWK library. The method may further include enabling the LWK library to manage the one or more second computing entities and the associated memory and resources needed by the application.

A system for enabling a Light-Weight Kernel (LWK) to run in a virtualized environment on a Full-Weight Kernel (FWK), in one aspect, may include a first computing entity having a FWK, a FWK loader and a LWK library deployed on the first computing entity. The LWK library may be executed as a process within the FWK via the FWK loader. The LWK library may be enabled to initialize one or more second computing entities and associated memory allocated to run an application under the LWK library. The LWK library may be further enabled to manage the one or more second computing entities and the associated memory and resources needed by the application.

A computer readable storage medium storing a program of instructions executable by a machine to perform one or more methods described herein also may be provided.

Further features as well as the structure and operation of various embodiments are described in detail below with ref-

DETAILED DESCRIPTION

Operating system kernel methodologies and structure may be provided that allow for FWK identity or capabilities, e.g., ability to invoke system calls via a system call interface (e.g., Portable Operating System Interface (POSIX) in Linux), threading capabilities, e.g., via library interface (e.g., Pthread), while maintaining HPC performance capabilities. The methodologies of the present disclosure may be referred to also as Fused OS.

Figure 1:
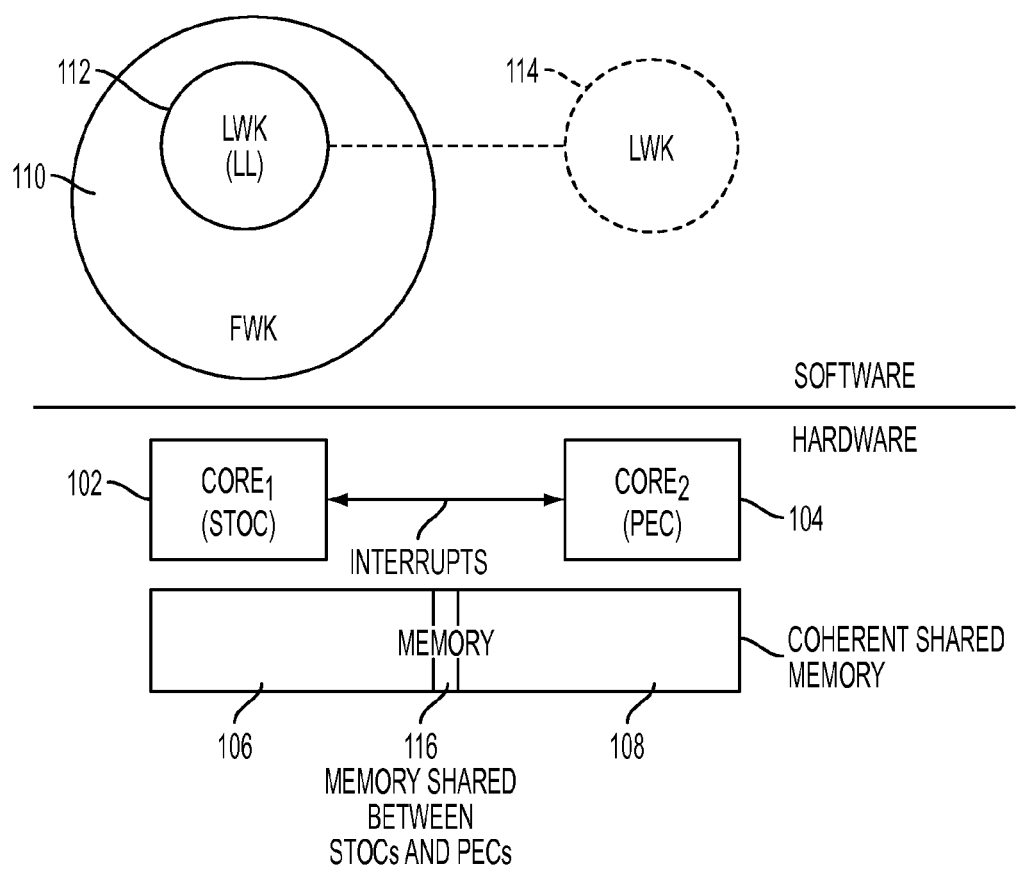
FIG. 1 shows a general overview of operating system structure of the present disclosure in one embodiment.

FIG. 1 shows an operating system structure of the present disclosure in one embodiment. An FWK 110 operates as the base operating system and the LWK 112 is partially virtualized as a guest. The FWK 110 runs on a subset of computing entities such as the cores 102. The LWK Library (LL), which is derived from the LWK 112, runs as an FWK process and runs on the remaining computing entities, e.g., cores 104. Memory 106 is divided between the FWK an LWK. This division provides the LWK with large, contiguous regions of memory and allows the LL to avoid memory management overhead.

Unlike previous operating system kernel approaches, the methodology of the present disclosure need not require significant modifications to FWK (e.g., Linux kernel). In one embodiment of the present disclosure, the FWK is modified to partition the physical memory at boot time and to redirect one or more selected system calls and exception to the LL. Those modifications achieve good performance, and they are small compared to the changes necessary in the ZeptoOS approach and the Schmueli approach.

Further, unlike previous operating system kernel approaches, the methodology of the present disclosure in one embodiment need not have a VMM dependency. A VMM such as Pallacios provides a complete hardware-layer abstraction to the guest operating system. In one embodiment, the methodology of the present disclosure virtualizes only those parts of the LWK that are selected to provide good performance and scalability. Examples of virtualized parts of the LWK in one embodiment of the present disclosure include memory management and thread scheduling functionalities.

In the following description, Linux is used as an example FWK. It should be understood, however, that the present disclosure does not limit the methodologies disclosed herein only to Linux; rather other FWK or the like may apply.

Referring to FIG. 1, cores 102, 104 and memory 106, 108 are partitioned between FWK and LWK in the scheme shown in FIG. 1. FWK 110 (e.g., Linux) runs as usual on one set of cores, e.g., Single-Thread Optimized Cores or STOCs 102. LWK 112 (e.g., CNK) is virtualized within a FWK (e.g., Linux) process and manages the other set of cores 104, e.g., Power-Efficient Cores or PECs 104. STOCs 102 and PECs 104 represent the potential heterogeneity that Fused OS comprising FWK 110 and LWK 112 can manage. In one embodiment of the present disclosure, STOCs 102 may be targeted for serial computation and any required system processing, while PECs 104 may be targeted for parallel computation. STOCs 102 have features found in high-performance, general-purpose processors such as strong integer performance and out-of-order execution. PECs 104 are optimized for power and space and have a subset of STOC features and need not contain capabilities such as supervisor mode. In one embodiment of the present disclosure, Fused OS are designed to be optimized for a coherent shared memory 106, 108 between and across STOCs 102 and PECs 104.

In one embodiment of the present disclosure, an LWK library that encapsulates LWK functionality may manage PECs 104. An example LWK library is the Compute Library (CL), a Linux application that encapsulates CNK functionality. It is built from CNK source code and runs as a user process on Linux. In one embodiment of the present disclosure, the LL 112 may cooperate with a small software monitor on the PEC 104 that acts mainly as an exception and system call handler. In another embodiment of the present disclosure, LL 112 may employ hardware support directly to start and stop a PEC 104 and to handle PEC exceptions.

FWK applications run on the cores allocated for FWK, and LWK applications run on the cores allocated for LL. For example, Linux applications run on the Linux cores in the usual manner. They are loaded by the standard ld.so, which loads and initializes the Executable and Linking Format (ELF) segments in the Linux memory partition and begins executing the application code. Briefly, the ELF is a standard portable object file format that works for a variety of operating systems and defines how an object file is composed and organized. ELF segments include information about application code and are mapped to virtual memory areas for execution. In one embodiment of the present disclosure, the LL replaces ld.so or FWK's dynamic loader or the like for LWK applications. The LL loads and initializes the ELF segments in the LL memory partition and begins executing application code on a free LL core. When an exception such as a system call or a page fault occurs on a LL core, control is passed back to the LL. After the exception is serviced, the LL resumes the LL core. The LL creates a Linux thread for each LL core that it allocates. This thread is used to service exceptions generated by application code running on the LL core. This allows the LL to handle multiple asynchronous requests such as file I/O on behalf of the application code running on the LL cores.

In one embodiment of the present disclosure, the hardware may provide the following hardware support: (1) allocate a LL core, (2) read/write the state of a LL core, (3) start/resume a LL core, and (4) after a LL core exception, pass control to a FWK (e.g., Linux) core. In another aspect, firmware or software may select one or more LL cores and make them available to a FWK or LL.

Referring to FIG. 1, FWK (e.g., Linux) applications may run as usual on STOCs 102. Applications that run on LWK (e.g, CNK on Blue Gene/Q or on other LWKs) may run "out of the box" on the PECs. To run a LWK (e.g., CNK) application, the LL 112 (e.g., CL) or the like requests a PEC 104, loads the LWK (e.g., CNK) application into the memory region 108 assigned to the PEC 104, stores startup information in a memory area 116 shared with the PEC 104, then requests the PEC 104 to start the application. A clone( ) system call or the like results in a new thread being started. The thread may run on the same PEC or another PEC. This approach allows Fused OS to support any thread-based runtime such as OpenMP. In one embodiment of the present disclosure, a LL 112 (e.g., CL) is started for each LWK (e.g., CNK) application, in the FWK 110 as a FWK process. In one embodiment of the present disclosure, a LL (e.g., CL) thread 114 is started for each LWK (e.g., CNK) application thread. The LL (e.g., CL) thread 114 handles the system calls and exceptions generated by the corresponding LWK (e.g., CNK) application thread. The LL (e.g., CL) thread 114 may handle the system calls in the same manner in which LWK (e.g., CNK) handles systems call for LWK (e.g., CNK) applications, e.g., shipping functions to FWK 110 (e.g., Linux).

When a LWK (e.g., CNK) application thread makes a system call or encounters an exception, the PEC hardware 104 sends an interrupt to the FWK hardware 102 and stores the system call or exception information in the shared memory area 116, then passes control to LL (e.g., CL) thread 114. Thus, exceptions occurring in a core 104 running LWK application are delivered to another core, e.g., STOC or the core that is hosting the LL. LL (e.g., CL) thread 114 is an FWK (e.g., Linux thread) and therefore can service the system call or handle exceptions. After the LL (e.g., CL) thread 114 services the system call or handles the exception, it resumes the LWK (e.g., CNK) application thread. After the LL handles an exception for an application, the LL may restart or kill the application, for instance, depending on the types of the exception. For example, in the case of system calls or other non-fatal exceptions, the application may be restarted with the result of the system call or other data associated with the exception; In the case of fatal exceptions, the application may be killed. Examples of fatal exceptions are those that the application cannot handle.

Figure 2:
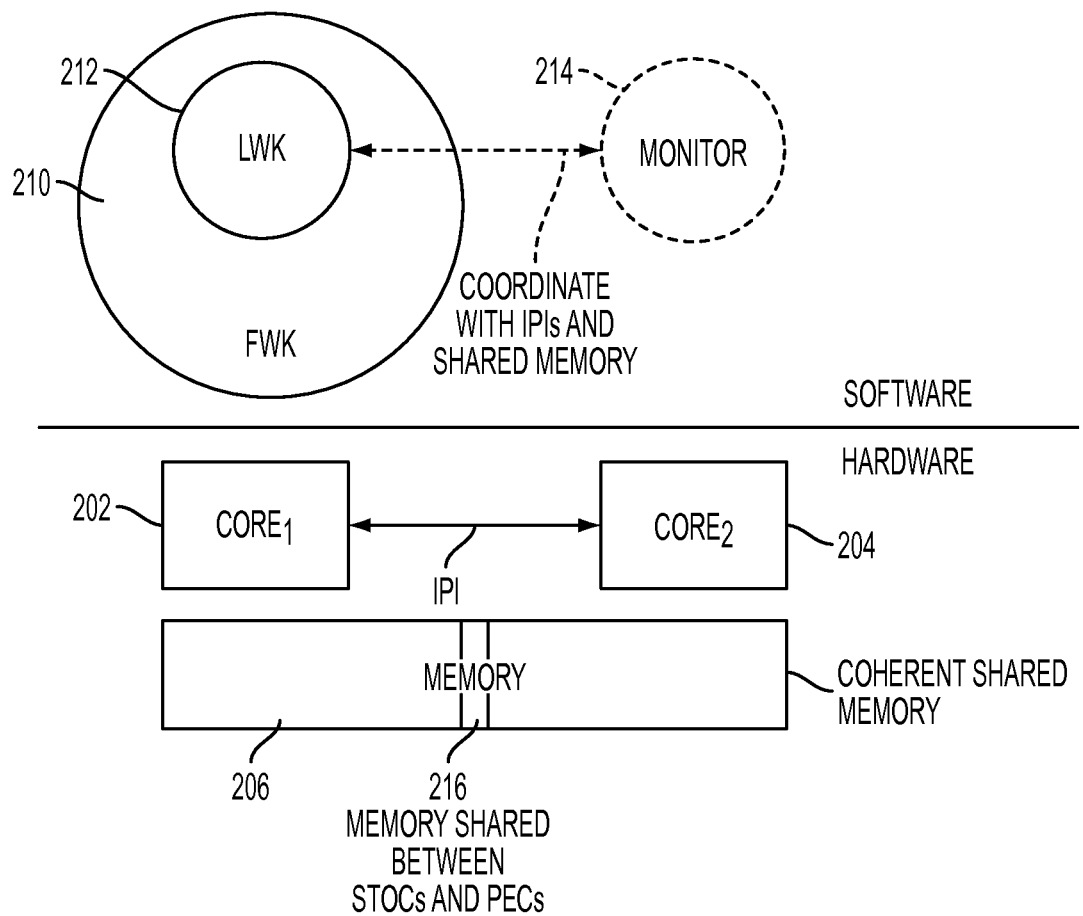
FIG. 2 shows an operating system structure of the present disclosure in one embodiment utilizing coherent shared memory.

FIG. 2 shows an operating system structure of the present disclosure in one embodiment that utilizes coherent shared memory. Cores 202, 204 may be partitioned between FWK 210 and LWK 212. The cores 202, 204 have shared memory 206. LWK 212 is virtualized within FWK 210 in that LWK 212 runs within a FWK 210 and remotely manages the cores allocated for LWK 212. In this embodiment, LWK 212 manages the cores by communicating with a software monitor 214 on those cores. The monitor 214 emulates hardware support functionalities and handles exceptions. The monitor 214 also manages Translation Lookaside Buffer (TLB) in coherent shared memory 106. Each core 204 allocated for LWK (referred to as LL core) may run a monitor 214 that waits for application code to execute. In this embodiment, hardware support is emulated on top of mechanisms in FWKs and multi-core processors. For example, Linux system calls can be used to emulate hardware instructions. In this way, hardware support which may include the ability to handle the exceptions on other cores may be emulated. Exception handlers of FWK (e.g., Linux) can be modified to redirect exceptions to the LL 212. For example, the monitor 214 catches exceptions occurring in the application running on the LL core 204 and redirects them to the LL 212. The communication between the monitor 214 and the LL 212 may be by Inter-Processor Interrupts, which can be used to signal a LL core exception at 104 to a Linux core 102.

In this embodiment, the ability to handle exceptions on other cores is emulated using Inter-Processor Interrupts (IPI) and the PEC monitor 214. The following illustrates an example pseudo code for the main monitor loop:

```
monitor( ) {
    wait for LL signal
    install TLB entries from shared memory area
    install exception handlers
    start application
}
```

The exception handlers fill in information about the exception (e.g., a system call) then sends an IPI to FWK 210 which forwards the signal to the LL 212. After the exception is handled, the LL 212 resumes the application.

Figure 9:
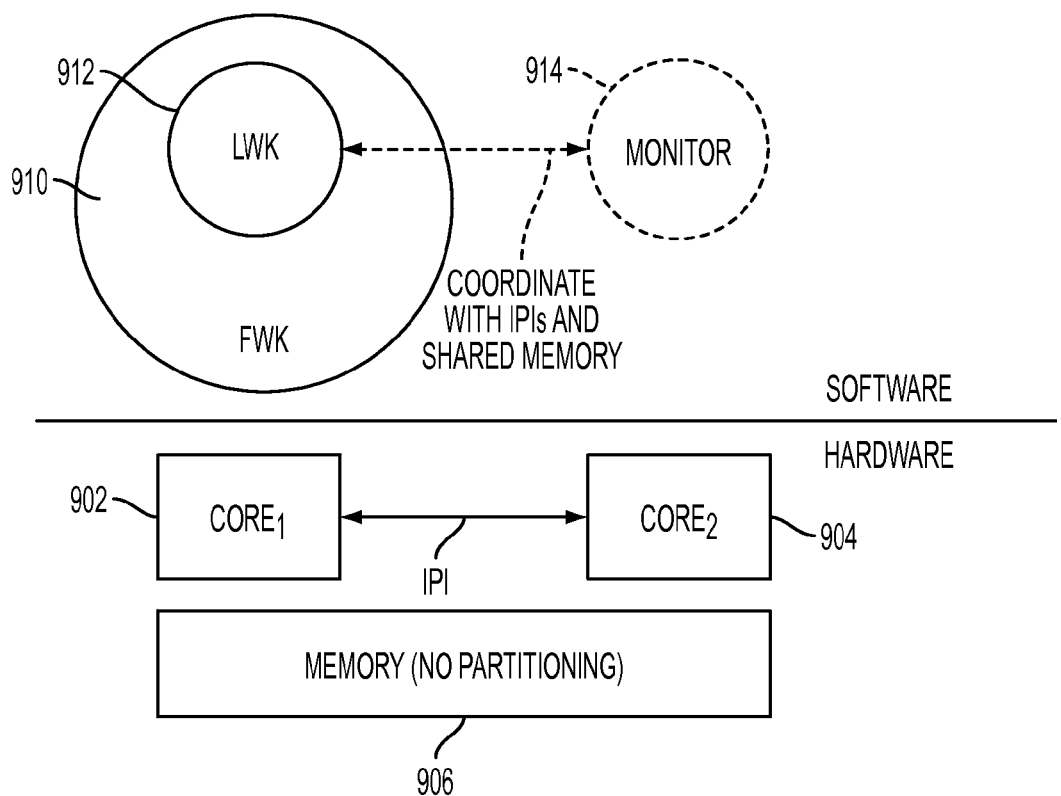
FIG. 9 shows another embodiment of an operating system structure of the present disclosure.

In another embodiment, a modified LL referred to as LL' can be used to run a FWK (e.g., Linux) application on the LL cores. FIG. 9 illustrates an example structure for this embodiment. LL' 912 is the same as the LL (e.g., FIG. 2 at 212) except that it does not perform memory management. In this example structure, the memory 906 is not partitioned. LL' 912 thus may be an LWK Library that manages the cores 904 or like computing entities. LL' 912 starts the FWK 910 (e.g., Linux) application on a LL core 904. Additional threads may be run on additional LL cores. Because FWK 910 (e.g., Linux) is managing all the application memory 906, calls such as fork and exec can be supported. A monitor 914 may function similarly to the monitor shown in FIG. 2 at 214.

Figure 3:
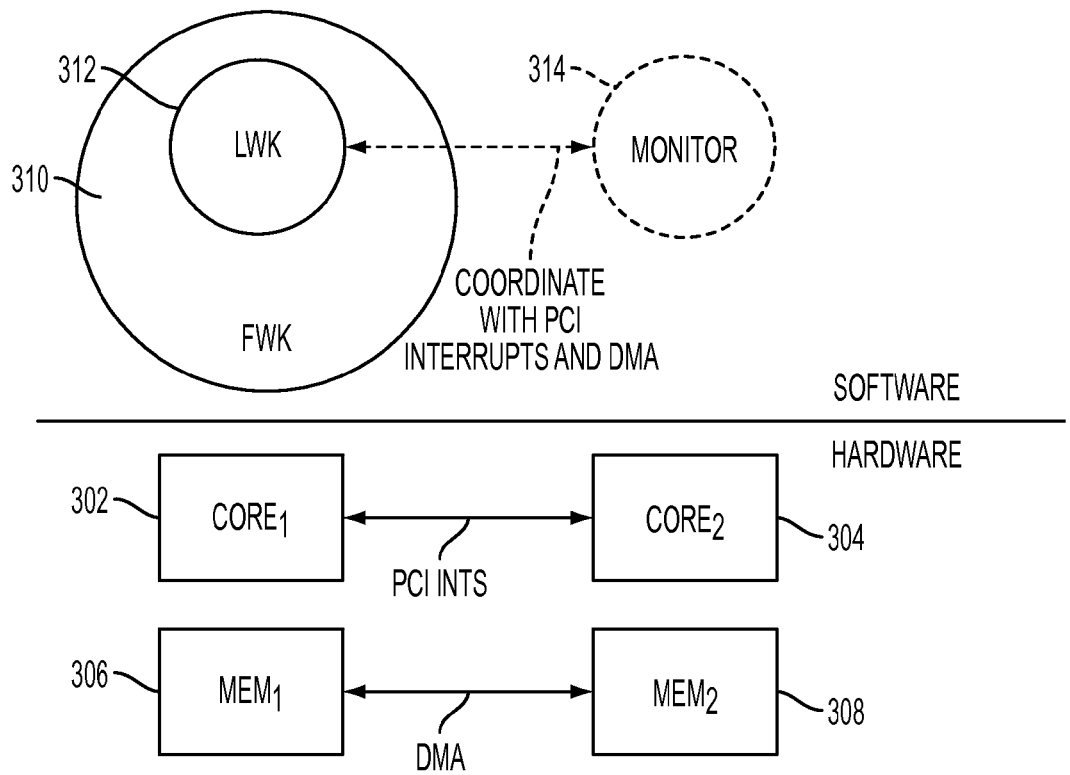
FIG. 3 shows an operating system structure of the present disclosure in one embodiment utilizing distributed memory.

FIG. 3 shows and operating system structure of the present disclosure in one embodiment distributed memory, multi-core platform. A core 302 runs FWK 310 and an LWK 312 within the FWK 310 as a process. A core 304 runs a monitor 314 that performs memory management and handles exceptions for application code running on the core 304. LWK 312 manages the core 304 by communicating with the monitor 314. The monitor 214 emulates hardware support functionalities and handles exceptions. The cores each have allocated memory 306, 308. The monitor 314 and the LWK 312 may communicate by device interrupts (e.g., Peripheral Component Interconnect (PCI interrupts)) and direct memory access (DMA) mechanisms. Data transfer between memory 306 and 308 may be performed via DMA. The monitor 314 running on the core 304 may catch an exception occurring in an application execution on the core 314 and pass the data associated with the exception in the local memory 308 to the LWK 312 process via DMA mechanism. LWK 312 handles the exception and communicates the resulting data associated with handling the exception from LWK's local memory 306 to the monitor 314 via DMA mechanism. System calls that need handling by the FWK 310 is also performed similarly. In this embodiment, information such as TLB entries and exception information is carried in messages between the cores.

Figure 4:
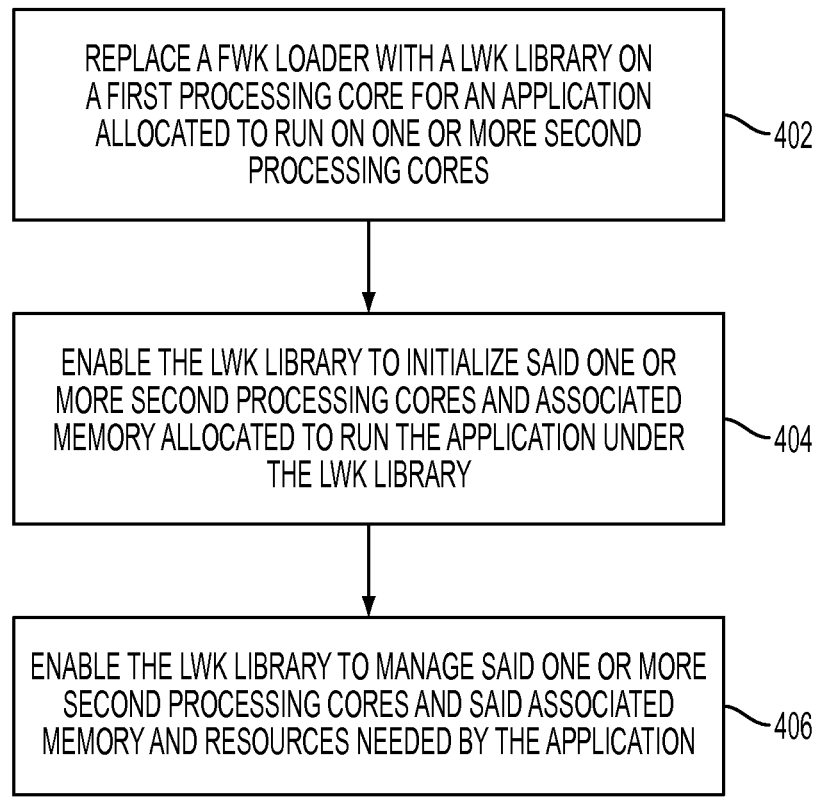
FIG. 4 shows a flow diagram illustrating a methodology for fused operating system in one embodiment of the present disclosure.

FIG. 4 shows a flow diagram illustrating a methodology for fused operating system in one embodiment of the present disclosure. At 402, a FWK loader or the like, e.g., used for dynamically loading and linking application code for execution, is replaced with a LWK library on a first processing core for an application allocated to run on one or more second processing cores. For instance, in one embodiment, for example, in the operating system structure shown in FIG. 2, this step may be accomplished with a FWK (e.g., Linux) system call. FWK manages the cores available to the LL. At 404, the LWK library is enabled to initialize the one or more second processing cores and associated memory allocated to run the application under the LWK library. At 406, the LWK library is enabled to manage the one or more second processing cores and the associated memory and resources needed by the application.

For example, in the operating system structure shown in FIG. 2, an LL thread corresponding to an application thread waits in the FWK (e.g., Linux kernel). The monitor's exception handler sends an IPI to FWK (e.g., Linux) which wakes up the LL thread, and then waits for a signal from the LL. After the LL application thread is done servicing the system call or another exception, it sends a signal to the monitor which resumes the application. The signal may be effected via shared memory. For example, the monitor waits for a shared memory location to change.

The management of the memory, cores, and other resources may be static, for example, fixed through the application's run. In another aspect, the management of the memory, cores, and other resources may be dynamic, where the amount and availability of the resources vary through the application's execution.

Figure 5:
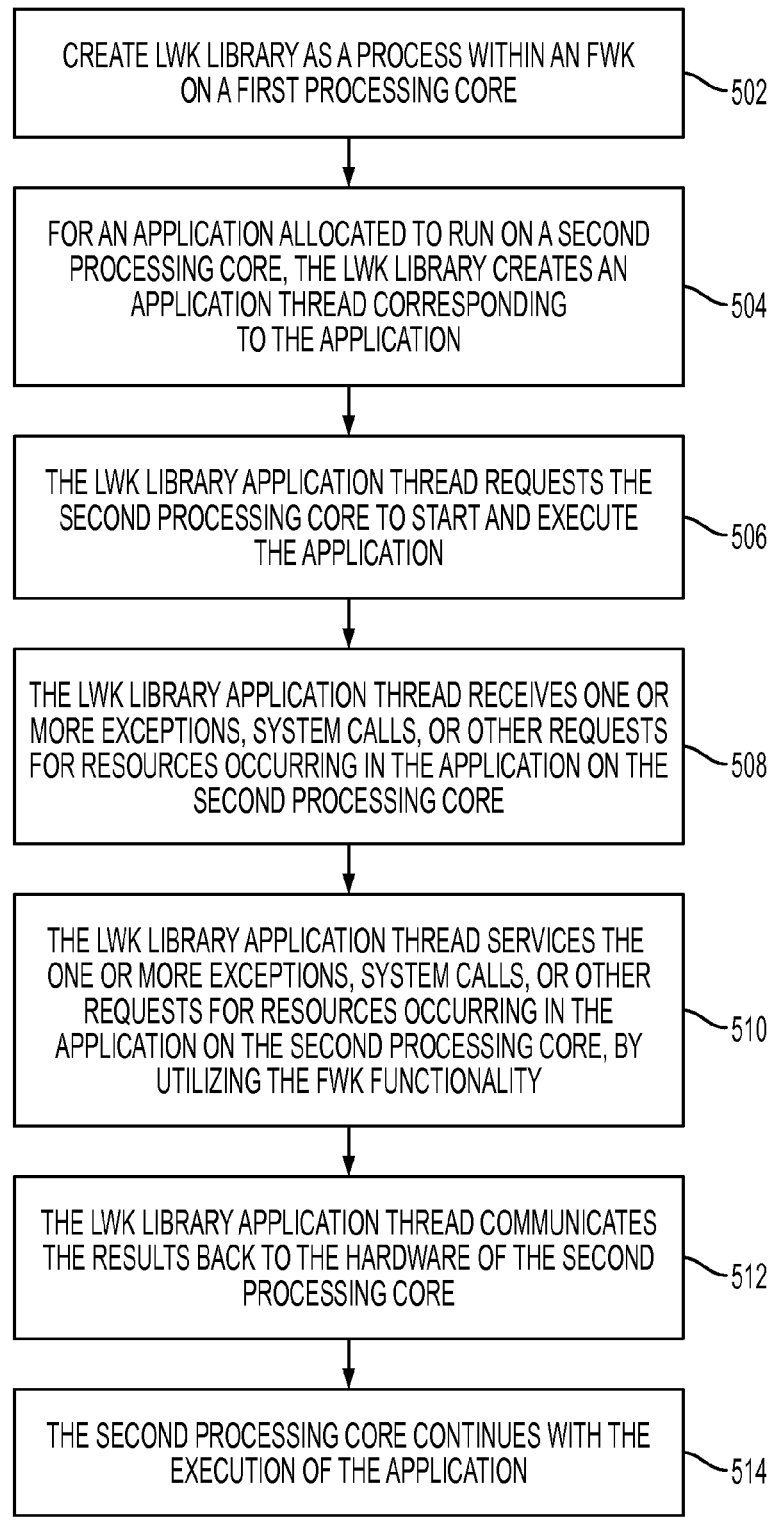
FIG. 5 is flow diagram illustrating a method of executing applications by a virtualized LWK on one or more cores in one embodiment of the present disclosure.

FIG. 5 is flow diagram illustrating a method of executing applications by a virtualized LWK on one or more cores in one embodiment of the present disclosure. At 502, an LWK library is created as a process within an FWK on a first processing core. For an application allocated to run on a second processing core, the LWK library creates an application thread corresponding to the application at 504. For example, an LL thread is created for each application thread. The LL thread handles the system calls and exceptions generated by the corresponding application thread. At 506, the LWK library application thread then requests the second processing core to start and execute the application. At 508, the LWK library application thread receives one or more exceptions, system calls, or other requests for resources occurring in the application on the second processing core. At 510, the LWK library application thread services the one or more exceptions, system calls, or other requests for resources occurring in the application on the second processing core, by utilizing the FWK functionality. This is possible since LWK library process that spawned the application thread is an FWK process. The LWK library application thread communicates the results back to the hardware of the second processing core at 512. The second processing core continues with the execution of the application at 514.

Figure 6:
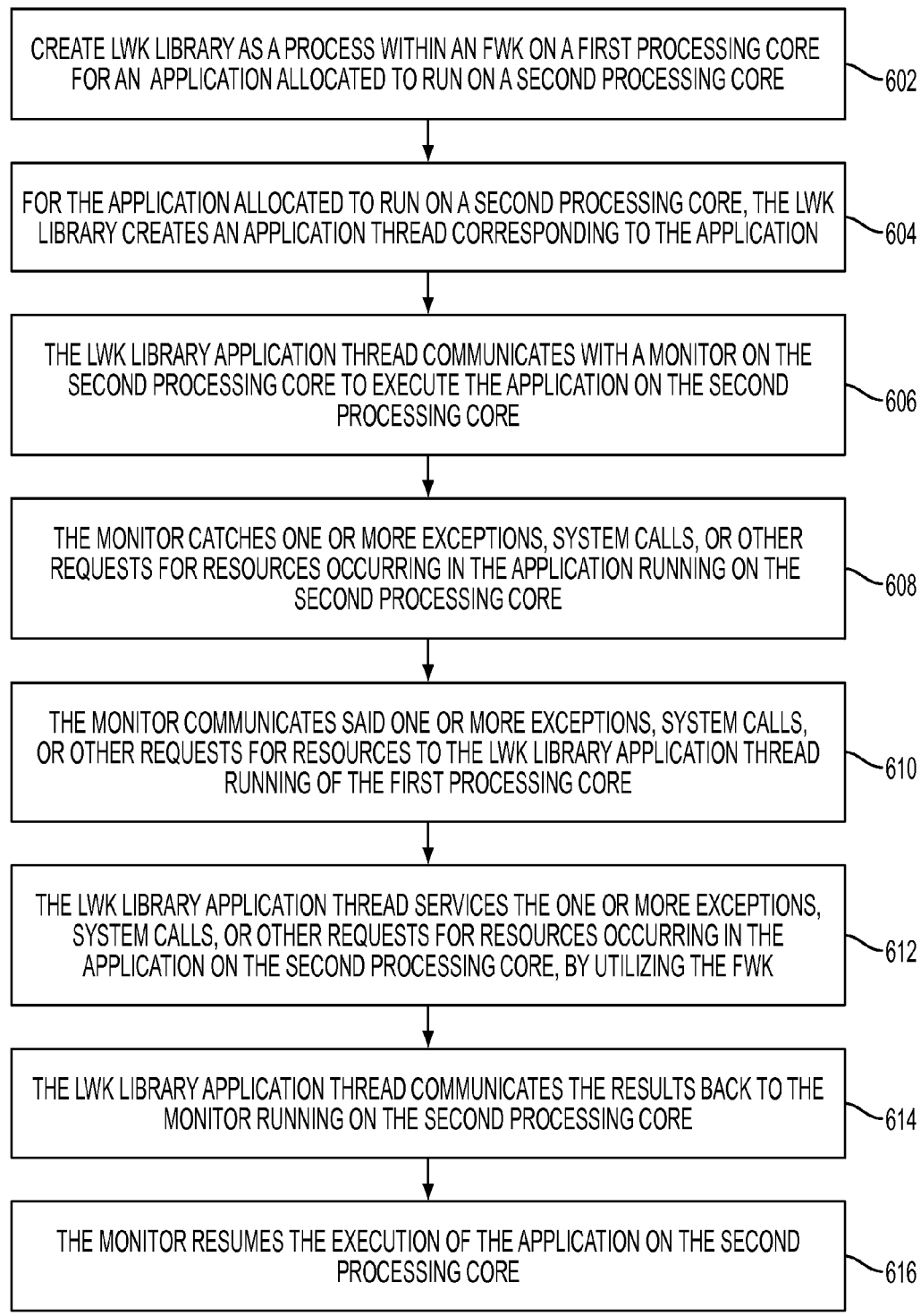
FIG. 6 is flow diagram illustrating a method of executing applications by a virtualized LWK on one or more cores in another embodiment of the present disclosure.

FIG. 6 is flow diagram illustrating a method of executing applications by a virtualized LWK on one or more cores having a monitor in another embodiment of the present disclosure. In this embodiment, the monitor running on the second processing core allocated for executing an application (application code such as user application) emulates functionalities of hardware. At 602, an LWK library is created as a process within an FWK on a first processing core. At 604, for an application allocated to run on a second processing core, the LWK library creates an application thread corresponding to the application. At 606, the LWK library application thread communicates with the monitor on the second processing core to execute the application on the second processing core. At 608, the monitor catches one or more exceptions, system calls, or other requests for resources occurring in the application on the second processing core. At 610, the monitor communicates the one or more exceptions, system calls, or other requests for resources to the LWK library application thread running of the first processing core. At 612, the LWK library application thread services the one or more exceptions, system calls, or other requests for resources occurring in the application on the second processing core, by utilizing the FWK functionality. At 614, the LWK library application thread communicates the results back to the monitor running on the second processing core. The monitor resumes the execution of the application on the second processing core at 616.

While the operating system structure and methodology of the present disclosure were described and shown as running on a core as an example, it should be understood that the systems and methods of the present disclosure may be applied in other hardware environment, or run and operate on computing entities such as, but not limited, to a hardware thread, hardware core, or other hardware defined mechanism for executing a logical instruction stream.

Figure 7:
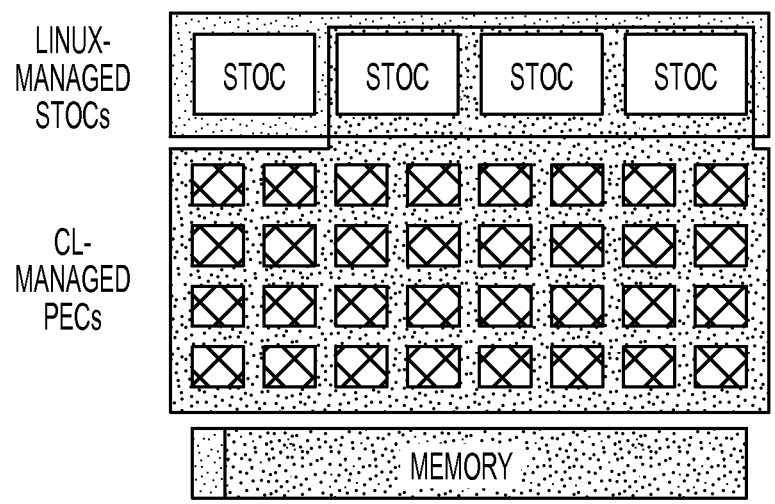
FIG. 7 and FIG. 8 show two possible configurations for partitioning of cores and memory based on applications.
Figure 8:
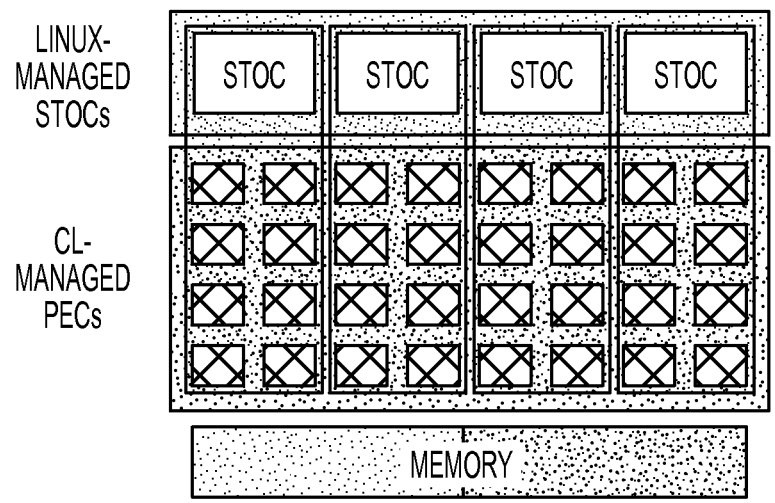

In one embodiment of the present disclosure, the partitioning of cores and memory is application dependent. FIG. 7 and FIG. 8 show two possible configurations. FIG. 7 shows a partitioning appropriate for HPC applications, in which most of the memory is allocated to the LL (e.g., CL)-managed PECs. The LL (e.g., CL) can utilize some of the STOCs to run sequential portions of the application more efficiently. FIG. 8 shows a partitioning appropriate for high-performance FWK (e.g., Linux) applications in which FWK (e.g., Linux) utilizes the PECs to parallelize computation.

Fused OS of the present disclosure in one embodiment is able to provide FWK (e.g., Linux) on compute nodes while providing LWK (e.g., CNK) performance for HPC applications by partitioning both cores and memory. This strategy addresses many cores by allowing cores to be partitioned. It addresses heterogeneous cores by allowing cores to be managed remotely. Fused OS in one embodiment of the present disclosure may eliminate operating system jitters by eliminating system code on cores running application code. Jitters caused by conflicts in caches may be addressed by cache-partitioning schemes.

In one embodiment of the present disclosure, applications will not see the dichotomy between FWK (e.g., Linux) and Fused OS. From the application's point of view the system will be FWK. To maintain LWK HPC performance, the application makes calls supported by LL (e.g., CL). For a functionality perspective, there is no need to code the application differently.

Fused OS may still use function shipping, however, the LL (e.g., CL) can provide additional functionality because it is a FWK (e.g., Linux) process. For example, FWK (e.g., Linux) processes and LWK (e.g., CNK) processes can share memory in one embodiment of the present disclosure. Fused OS minimizes changes to FWK (e.g., Linux) by running LWK (e.g., CNK) as a FWK (e.g., Linux) process. In one embodiment, the changes to FWK (e.g., Linux) may be to hooks in the bootstrap and exception vectors. The hooks in the bootstrap enable partitioning of the cores and memory. The hooks in the exception vectors enable passing control to the LL (e.g., CL). All other code may be placed in a file system module, which is independent of FWK (e.g., Linux). File system modules respect the Linux module API. Fused OS allows LL (e.g., CL) to leverage LWK (e.g., CNK) technology through code reuse. For instance, large portions of the CNK code including application loading, memory management, and thread management may be reused and enhance. Because LL (e.g., CL) is running as a FWK (e.g., Linux) process, Fused OS need not use a VMM. For example, modifications to Linux may provide the necessary mechanisms to run CL. In addition, Fused OS of the present disclosure in one embodiment may be utilized in Exascale system execution environments.

The present disclosure presents methodologies to bridge the gap between LWKs and FWKs, for instance, without the disadvantages of previous approaches. The methodology of the present disclosure in one embodiment may leverage the work from an existing LWK. In addition, exception handling is transparent to the application in one embodiment of the present disclosure.

Fused OS of the present disclosure in one embodiment provides mechanisms to run different type of operating systems, for example a base operating system and a guest operating system that are different, for example, in which exceptions or memory allocations may be handled differently. Fused OS in one embodiment employs hardware support that allows the fused OS to be able to manage cores without supervisor mode. In another embodiment without hardware support, a small monitor may be implemented to support management of cores by the LWK or guest operating system on the FWK.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of enabling a Light-Weight Kernel (LWK) to run in a virtualized environment on a Full-Weight Kernel (FWK), the LWK providing higher performance scalability than the FWK and having less functionality than the FWK, the method comprising:
   replacing invoking of a FWK loader that dynamically loads and links application codes for execution, with invoking of a LWK library on a first hardware processor for an application allocated to run on one or more second hardware processors;
   enabling the LWK library to initialize said one or more second hardware processors and associated memory allocated to run the application under the LWK library; and
   enabling the LWK library to manage said one or more second hardware processors and said associated memory and resources needed by the application,
   wherein the LWK library is executed on the first hardware processor as a process within the FWK running on the first hardware processor,
   wherein the LWK library accesses data associated with one or more system calls and exceptions occurring in the application written from said one or more second hardware processors, to service said one or more system calls and exceptions from the first hardware processor by utilizing an FWK functionality.

2. The method of claim 1, wherein the first hardware processor and said one or more second hardware processors include a hardware thread, hardware core, or other hardware defined mechanism for executing a logical instruction stream.

3. The method of claim 1, wherein said one or more second hardware processors, said associated memory and resources are managed statically by the LWK library.

4. The method of claim 1, wherein said one or more second hardware processors, said associated memory and resources are managed dynamically based on execution of said application by the LWK library.

5. The method of claim 1, wherein hardware of said one or more second hardware processors writes said data associated with system calls and exceptions occurring in the application to shared memory.

6. The method of claim 1, wherein a monitor running on said one or more second hardware processors writes said data associated with system calls and exceptions occurring in the application to shared memory.

7. The method of claim 1, wherein a monitor running on said one or more second hardware processors communicates said data associated with system calls and exceptions occurring in the application to said LWK library via DMA mechanism.

8. The method of claim 1, wherein one LWK library thread is generated for corresponding one application to be executed on said one or more second hardware processors.

9. The method of claim 1, wherein said first hardware processor and said one or more second hardware processors are nodes in a massively parallel high performance computing system.

10. A non-transitory computer readable storage medium storing a program of instructions executable by a machine to perform a method of enabling a Light-Weight Kernel (LWK) to run in a virtualized environment on a Full-Weight Kernel (FWK), LWK providing higher performance scalability than the FWK and having less functionality than the FWK, the method comprising:
    replacing invoking of a FWK loader that dynamically loads and links application codes for execution, with invoking of a LWK library on a first hardware processor for an application allocated to run on one or more second hardware processors;

enabling the LWK library to initialize said one or more second hardware processors and associated memory allocated to run the application under the LWK library; and enabling the LWK library to manage said one or more second hardware processors and said associated memory and resources needed by the application, wherein the LWK library is executed on the first hardware processor as a process within the FWK running on the first hardware processor, wherein the LWK library accesses data associated with one or more system calls and exceptions occurring in the application written from said one or more second hardware processors, to service said one or more system calls and exceptions from the first hardware processor by utilizing an FWK functionality.

11. The non-transitory computer readable storage medium of claim 10, wherein the first hardware processor and said one or more second hardware processors include a hardware thread, hardware core, or other hardware defined mechanism for executing a logical instruction stream.

12. The non-transitory computer readable storage medium of claim 10, wherein said one or more second hardware processors, said associated memory and resources are managed statically by the LWK library.

13. The non-transitory computer readable storage medium of claim 10, wherein said one or more second hardware processors, said associated memory and resources are managed dynamically based on execution of said application by the LWK library.

14. The non-transitory computer readable storage medium of claim 10, wherein hardware of said one or more second hardware processors writes said data associated with system calls and exceptions occurring in the application to shared memory.

15. The non-transitory computer readable storage medium of claim 10, wherein a monitor running on said one or more second hardware processors writes said data associated with system calls and exceptions occurring in the application to shared memory.

16. The non-transitory computer readable storage medium of claim 10, wherein a monitor running on one or more second hardware processors communicates said data associated with system calls and exceptions occurring in the application to said LWK library via DMA mechanism.

17. The non-transitory computer readable storage medium of claim 10, wherein one LWK library thread is generated for corresponding one application to be executed on said one or more second hardware processors.

18. The non-transitory computer readable storage medium of claim 10, wherein said first hardware processor and said one or more second hardware processors are nodes in a massively parallel high performance computing system.

19. A system for enabling a Light-Weight Kernel (LWK) to run in a virtualized environment on a Full-Weight Kernel (FWK), LWK providing higher performance scalability than the FWK and having less functionality than the FWK, comprising:

a first hardware processor having a FWK;

a FWK loader that dynamically loads and links application codes for execution, and a LWK library deployed on the first hardware processor, wherein invoking of the FWK loader is replaced with the LWK library for an application allocated to run on one or more second hardware processors, wherein the LWK library is executed as a process within the FWK via the FWK loader, and wherein the LWK library is enabled to initialize said one or more second hardware processors and associated memory allocated to run the application under the LWK library, and wherein the LWK library is further enabled to manage said one or more second hardware processors and said associated memory and resources needed by the application, wherein the LWK library accesses data associated with one or more system calls and exceptions occurring in the application written from said one or more second hardware processors, to service said one or more system calls and exceptions from the first hardware processor by utilizing an FWK functionality.

20. The system of claim 19, wherein the first hardware processor and said one or more second hardware processors include a hardware thread, hardware core, or other hardware defined mechanism for executing a logical instruction stream, or combinations thereof.

21. The system of claim 19, further including a shared memory, wherein the LWK library services exceptions occurring in the application via the shared memory.

22. The system of claim 19, wherein one LWK library thread is generated for corresponding one application to be executed on said one or more second hardware processors.

* * * * *